United States Patent [19]
Johnson

[11] Patent Number: 4,917,442
[45] Date of Patent: Apr. 17, 1990

[54] DEMOUNTABLE TRAILER WHEEL

[76] Inventor: James H. Johnson, 1020 Pinecrest St., Vidor, Tex. 77662

[21] Appl. No.: 284,402

[22] Filed: Dec. 14, 1988

[51] Int. Cl.$^4$ .............................................. B60B 37/06
[52] U.S. Cl. ................................... 301/113; 301/111; 403/328; 403/354
[58] Field of Search ........ 301/111, 112, 113, 118–122, 301/128, 109, 110, 124 H, 132; 403/13, 14, 378, 379, 328, 354; 285/24, 27, 317

[56] References Cited

U.S. PATENT DOCUMENTS

| | | | |
|---|---|---|---|
| 2,562,720 | 7/1951 | Ickes | 301/128 |
| 3,345,711 | 10/1967 | McCarthy | 403/379 |

FOREIGN PATENT DOCUMENTS

| | | | |
|---|---|---|---|
| 828645 | 1/1952 | Fed. Rep. of Germany | 301/111 |
| 11818 | 7/1914 | United Kingdom | 301/121 |
| 1507679 | 4/1978 | United Kingdom | 301/113 |

*Primary Examiner*—Russell D. Stormer
*Attorney, Agent, or Firm*—Roy H. Smith, Jr.

[57] ABSTRACT

A connection for quickly mounting and removing wheels from a trailer, without removing or replacing lug nuts. The wheel assembly includes a non-rotating shaft or axle which serves as its journal. This journal is inserted and received snugly within a sleeve rigidly secured to the frame of the trailer, and pin and other connecting elements are added to prevent relative rotation and axial movement between journal and sleeve. Various embodiments are disclosed, including a simple pin dropped into aligned transverse openings in the two members and interfitting members on journal and sleeve which halt inward movement of the journal and its rotation, such as an axial pin and hole, radial slot and key, and touching flat surfaces on the two members.

1 Claim, 3 Drawing Sheets

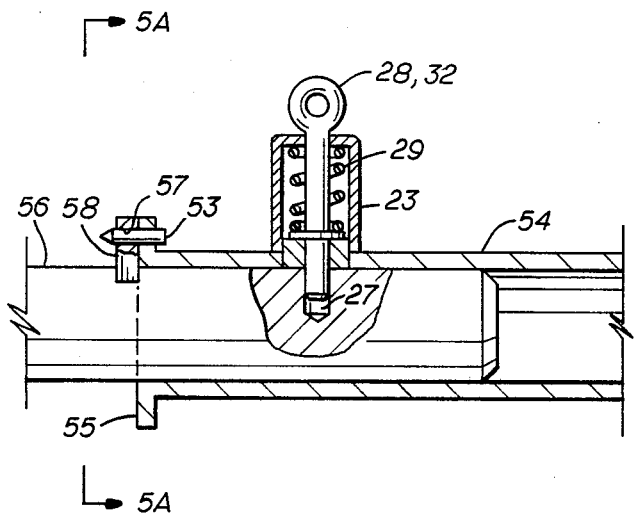 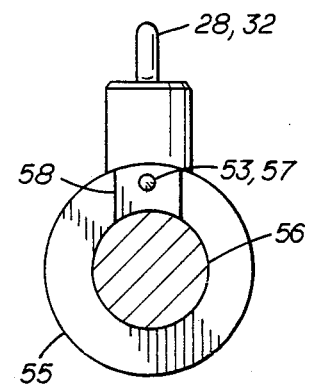
FIG. 5  FIG. 5A
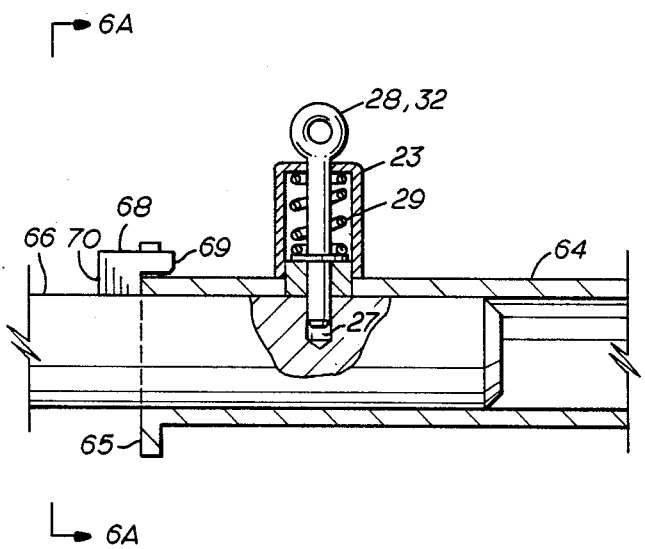 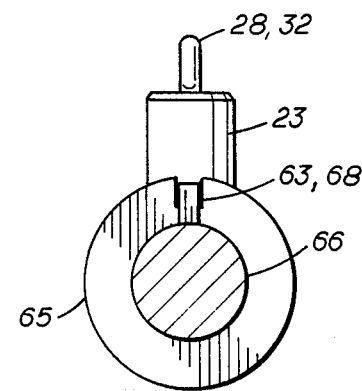
FIG. 6  FIG. 6A

DEMOUNTABLE TRAILER WHEEL

The invention disclosed herein is in the field of wheels and wheel mountings not involving steering or power transmission, i.e., idler wheels. It is particularly concerned with trailer wheel mountings which are so constituted that a wheel may be mounted or removed with a minimum of time and labor.

Various entities including highway departments make extensive use of trailers having a sign or message display mounted to stand upwardly from the bed of the trailer. This sign contains either an advertising message or some information in the nature of a warning, and the trailer is usually parked close to a street or highway, sufficiently close so that motorists driving on the adjacent roadbed can readily observe and read the sign. Typically, the trailer is thus parked in one location for an extended period of time, a matter of days or weeks. Thereafter, it may be towed to another location, with either the same or a different message on its signboard. While at any one of these locations, for the most part the trailer is unattended and not even under the observation of the owner.

Experience has shown that a trailer thus unattended and unobserved is subject to vandalism and theft. To avoid theft of the wheels, it has become a common practice for the owner or highway crew to remove the wheels after parking the trailer and leaving it unattended. The wheels are carried away and not brought back to the trailer until the time arrives to move it to a new location.

The standard practice in removing and later replacing the trailer wheels has been to jack the trailer up, make use of a lug wrench to loosen the several lug nuts which hold the rim of the wheel to its hub, remove the rim with the tire mounted on it, ease off on the jacks to lower the trailer body to the ground, and carry off all such rim/tire subassemblies. While this procedure works well enough, it is costly in working time, as each lug must be separately backed off, and a tight lug will prolong the time required.

The principal object of the present invention is to provide a structure which avoids the need to loosen and remove lug nuts when removing a wheel from a trailer, or when performing the opposite procedure of remounting the wheel. The structure includes a wheel assembly in which the wheel is permanently mounted on a non-rotating journal, a non-rotating hollow axle or sleeve permanently secured to the frame of a trailer, and connecting means for detachably securing these two members together. The journal and sleeve are so shaped and sized that the journal is slidably and snugly received within the sleeve, with the sleeve in a horizontal attitude, which of course is also orthogonal to its long dimension for proper movemnt in the towing direction. Various geometries are possible, for instance the cross section of both members could be square, but the simplest geometry, cylindrical, is illustrated because it is the most commonly available type. Various means may be used to secure the journal and sleeve together, the simplest being a pin which is dropped through aligned openings in the two members. Such a connection prevents relative linear motion of either member and, for cylindrical shapes, also prevents any relative rotation.

The invention may perhaps be better comprehended by reading the following detailed description of a preferred embodiment in conjunction with the drawing accompanying and forming an integral part of this document. In the drawings:

FIG. 1 is an isometric view of the preferred embodiment of the invention, showing its employment on a sign-bearing trailer, FIG. 2 is a longitudinal section through the journal and sleeve members of the same preferred embodiment after they have been connected together to mount the wheel to the trailer, together with the simple pin member which holds them in the connected or assembled position, FIG. 2A is a cross section of the assembly of FIG. 2, as indicated by the cut lines, arrows and legend of FIG. 2, FIGS. 3, 4, 5 and 6 are longitudinals section similar to that of FIG. 2 but illustrating alternate means for connecting the journal and sleeve members, while FIGS. 3A, 4A, 5A, and 6A cross sections similar to that of FIG. 2A but applicable respectively to FIGS. 3, 4, 5 and 6.

DETAILED DESCRIPTION OF THE INVENTION

Figure 1:
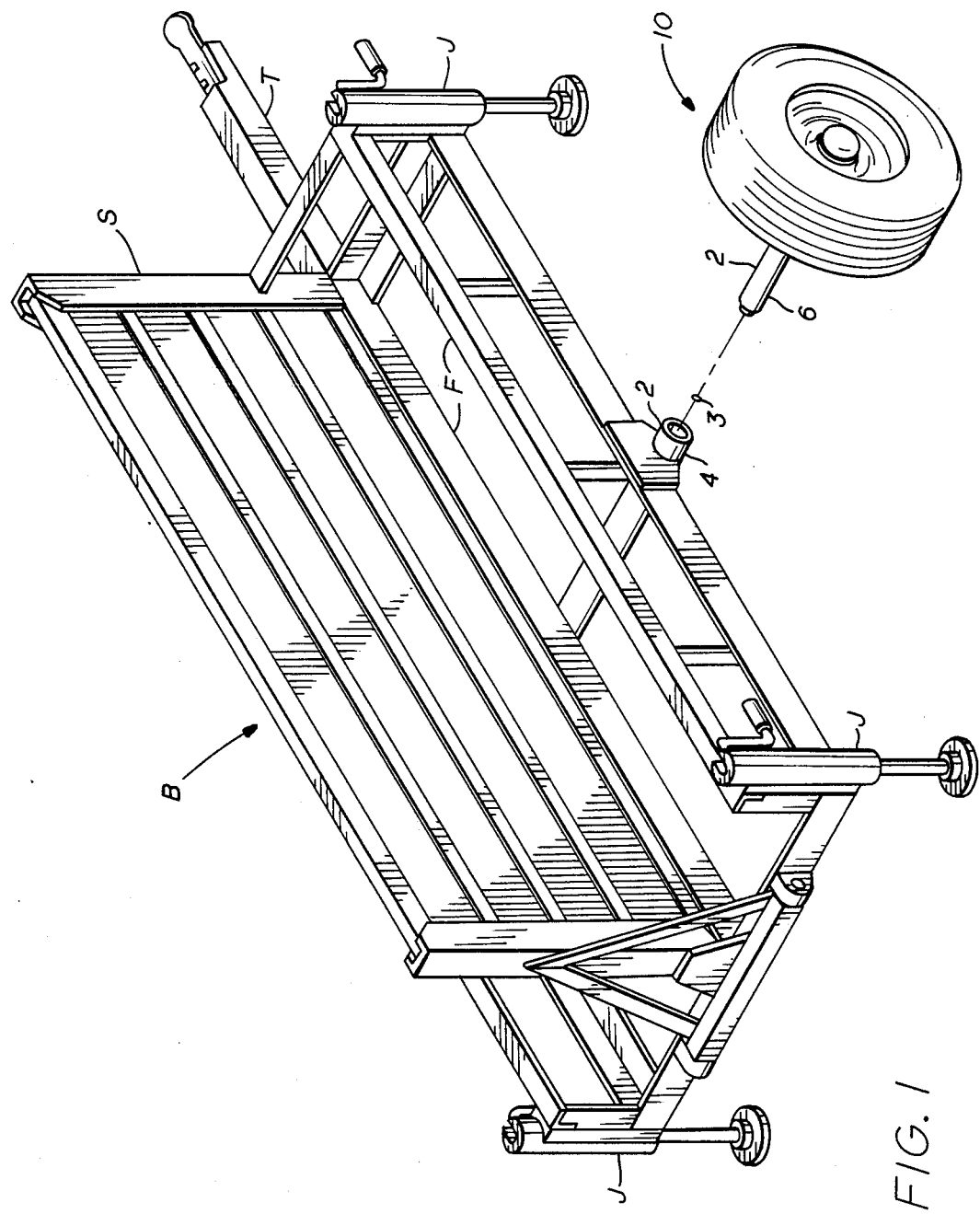

As shown in FIG. 1, the connection 2 of the invention is being used on a trailer body B consisting basically of a frame F having jacks J at its four corners and provided with a tongue T for towing purposes and a sign S upstanding from the frame. The reference character "2" appears twice in the figure, with the wheel assembly 10 and with the sleeve member 4, to emphasize that 2 is a connection between these two members. Also illustrated in this figure is the right hand wheel assembly 10, shown disassembled or exploded from the trailer to better view the nature of the connection 2. The connection includes the socket or sleeve member 4 which is permanently secured to the trailer frame F with its axis 3 in a horizontal position, journal member 6 forming a part of the wheel assembly 10, and a connecting member not shown in FIG. 1 to releasably connect members 4 and 6 together. It should be noted that the wheel assembly 10 includes the illustrated tire mounted on its associated rim, together with hub and bearing members not shown. The latter mentioned members are not illustrated because they are not a part of the structure of the present invention. It is sufficient to observe that the rotating portion of wheel assembly 10 is rotatably mounted on the journal member 6; when journal 6 is held in a fixed position and spinning force is applied to the tire of the assembly, it will rotate on journal 6. It might also be noted that sleeve 4 has an opening or bore in each end, of a size and shape to snugly receive a journal 6 in horizontal position. Of course, between the axial lengths of such bores necessary to accommodate the pair of journals there is no restriction on this member. It may be solid, or there may be two distinct sleeves on opposite sides of the frame with a gap inbetween.

Figure 2:
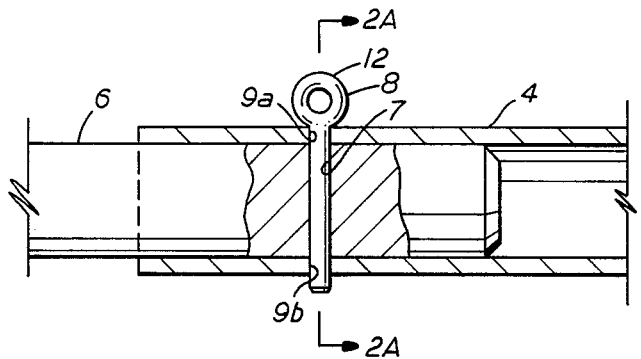
Figure 2A:
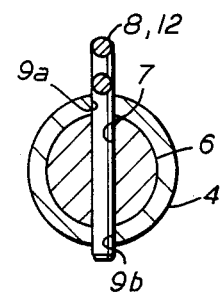

FIGS. 2 and 2A illustrate the relationship of the same journal 6 and sleeve 4 in assembled condition. To make the assembly, journal 6 is pushed into sleeve 4 until the opening 7 through the journal is aligned with the pair of openings 9a and 9b in the sleeve, whereupon the pin 8 is dropped through the openings to releasably lock journal and sleeve together. An enlarged head 12 on pin 8 prevents it from slipping completely through the openings, and a head 12 with the illustrated eyelet shape provides a convenient place to add a keeper safeguard, for instance one end of a short chain or wire, the other end of which may be secured to the frame of the trailer.

Of course, the difficulty of aligning three holes may be reduced by eliminating the lower opening 9b in the sleeve.

Figure 3:
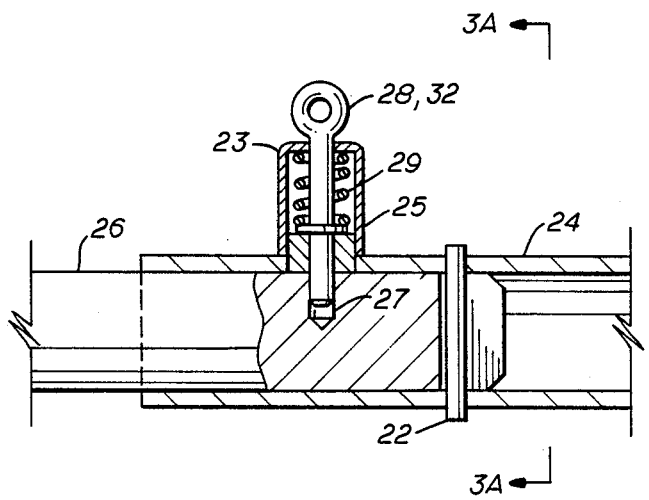
Figure 3A:
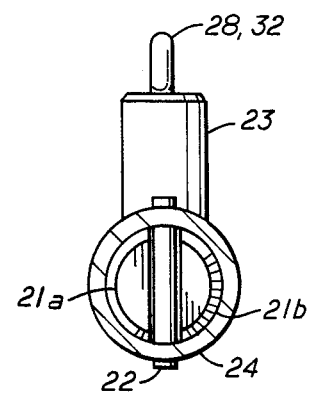

FIGS. 3 and 3A illustrate a connection which avoids some of the difficulty of aligning two or three holes in two dimensions at the same time. In this alternative structure a short rod 22 is spiked or fixed permanently in the bore of sleeve 24 to divide it into halves, and a central slot is formed in the lead portion of journal 26 to bifurcarte it into portions 21a and 21b, and of course the fixed pin 22 is received in the slot between portions 21a and 21b. This interfit prevents rotation of journal 26 within sleeve 24 and prevents the journal from sliding too deeply into the sleeve, but can not prevent the journal from sliding out of interfit, to the left in FIG. 3. To prevent such withdrawal type sliding motion, a releasable pin 28 is employed, this pin being received in a blind radial opening 27 in the solid part of journal 26. The provision of spring 29 and stop plate 25 surrounding the shaft of pin 28, operating within the housing 23 fixed to the top of sleeve 24, avoids the necessity for completely removing this pin. The operator simply pulls pin 28 upwardly until it is completely clear of journal 26, at which time he can slide the journal out of engagement. He must also retract pin 28 during an assembly operation, because spring 29 biases it to the position shown in FIG. 3, but it should be noted that this assembly can be accomplished blidfolded; the operator pushes the jornel inwardly until stop rod 22 is first encountered, then rotates it while still pushing gently until rod 22 falls into the slot in the end of the journal. This brings rod 28 into alignment with blind opening 27, amd it should pop into the opening with little or no help.

Figure 4:
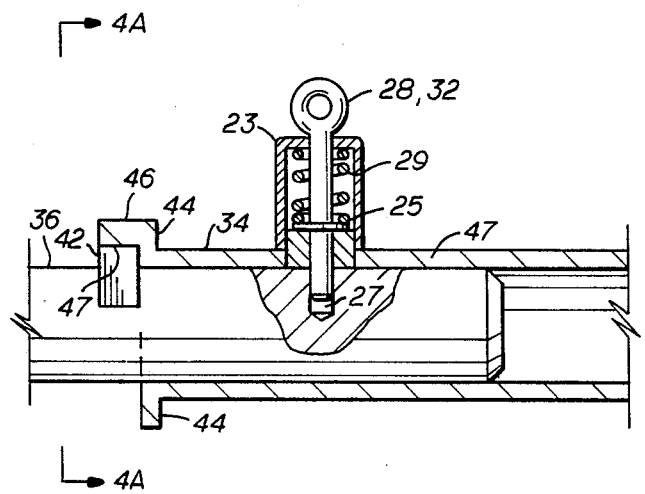
Figure 4B:
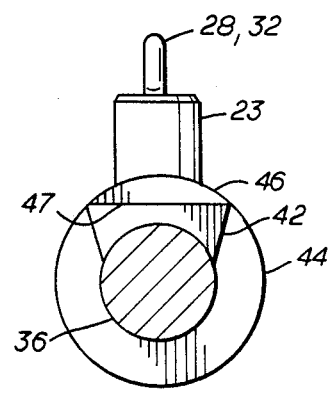

The alternative embodiment of FIG. 4 makes use of the same pin assembly 23, 25, 28 and 29 as in FIG. 3, but employs a different interfit to provide a quick and blindly-operating orientation, In this form of connection, the journal 36 is provided with an integral boss 42 projecting upwardly from its upper surface, such boss having an angular shape as exemplified in the figure, rather than a cicualar or annular configuration. At its entry end the sleeve 34 is provided with an outturned flange 44 having an axial extension 46 projecting beyond the flange 44. This extension has the flat lower surface 47 shown, conforming to the upper surface of the angular boss 42 on journal 36. It will be evident that, when these two surfaces are brought into contact, aw shown in the drawing, the journal 36 can be pushed no deeper into sleeve 24, nor can it be rotated with respect to the sleeve.

The alternative embodiments of FIGS. 5 and 6 also make use of the same pin assembly 23, 25, 28 and 29 as in FIG. 3, but employ different interfits to provide quick and blindly-operating orientation. In FIG. 5 the open end of sleeve 54 is provided with a simple outturned flange 55, and in this flange is securely mounted a short rod 53. Rod 53 projects axially beyond the flange 55 a short distance, and preferably has the beveled or conical tip illustrated as an aid to assembly. The mating structure on journal 56 is provided by an upstanding boss 58 secured to the outer surface of the journal, such boss 58 having an axial opening 57 to receive the rod 53 projecting from the sleeve member. The pin member 28 will only pop into place in opening 27 in the journal 56 after rod 53 is fully seated in opening 57, and must be manually withdrawn to unlock the membbers during a diassembly procedure. Of course, the rod and opening structure shown could be reversed, i.e., rod 53 can be mounted on the boss of the journal to enter an opening in the flange of the sleeve, in which event the rod should be reversed so that its pointed end faces toward the sleeve.

FIG. 6 illustrates structure similar to that just mentioned, the sleeve member 64 of this alternate embodiment being provided with a flange 65 having a radial slot 63 rather than a pin. The mating structure on journal 66 is a key 68 secured to the outer surface of the journal, and key 68 is, of course, sized to extend into and be received in the slot 63 of the sleeve. The L-shaped configuration of key 68 permits only its horizontal leg 69 to enter the slot while its vertical leg 70 contacts the end of sleeve 64 and thus serves as a stop. Pin subassembly 28 is constructed and operates as in the embodiments already described.

It will now be apparent that this document discloses structure which can be employed with "sign trailers" to remove wheel assemblies from the trailers, and later remount such wheel assemblies, with a minimum expenditure of time and labor. No lug nuts need to be removed or replaced, as the entire wheel assembly is removed - not only the rim and tire but also the hub, bearings and non-rotating shaft or journal, furnishing the additional advantage of protecting such parts from the weather, and from theft and vandalism. The structure of the invention requires only one person to operate it, and all the sole operator need do is push the journal of a wheel assembly into a sleeve fixed to the trailer and insert or remove a pin.

Now that a preferred embodiment has been described, it will be apparent to those of average skill in the art that there are many variations of the invention which do not depart from its central concept. The scope of the invention should not be limited by the foregoing description, but only by the following claims, which should be construed to embrace all substantially equivalent means operating in substantially the same manner to obtain substantially the same results.

What is claimed is:

1. A connection for mounting a wheel on a trailer comprising a non-rotating journal on which the wheel is mounted, a sleeve rigidly secured to the trailer and horizontally disposed for forward motion, said sleeve having an opening or bore snugly receiving said journal, and a pair of connection means to prevent relative rotation and relative axial movement between journal and sleeve, the first of said connection means being a pin received in aligned transverse openings in the sleeve and journal and the second connecting means being a spiking pin extending transversely through the sleeve only to divide its bore into two portions and a slot formed in the end of said journal member to divide the forward end of the journal into two like portions, the spiking pin of the sleeve being received in the slot of the journal member to halt linear progress of the journal during assembly and also preventing relative rotation, said second connection means being disposed so that proper seating of the spiking pin in the journal slot also brings the aligned transverse openings of the first connecting means into proper alignment to receive the pin member thereof, and also being disposed for disassembly, after withdrawal of the pin of the first connecting means, by a simple axial withdrawal (non-rotating) motion of the journal member relative to the sleeve, said forward end of the journal member terminating in a flat transverse surface interrupted only by said slot which receives the spiking pin.

* * * * *